United States Patent [19]
Barnaby et al.

[11] Patent Number: 6,006,303
[45] Date of Patent: Dec. 21, 1999

[54] PRIORITY ENCODING AND DECODING FOR MEMORY ARCHITECTURE

[75] Inventors: Michael J. Barnaby; Abe Mammen, both of Marlborough, Mass.

[73] Assignee: OKI Electric Industry Co., Inc., Tokyo, Japan

[21] Appl. No.: 08/919,152

[22] Filed: Aug. 28, 1997

[51] Int. Cl.⁶ .................................................... G06F 13/18
[52] U.S. Cl. ........................... 710/244; 710/240; 710/41; 710/40; 711/151
[58] Field of Search ................................ 710/240, 40, 41, 710/244, 113, 35, 36, 116, 117; 711/169, 151

[56] References Cited

U.S. PATENT DOCUMENTS

| | | |
|---|---|---|
| 3,283,308 | 11/1966 | Klein et al. . |
| 4,263,649 | 4/1981 | Lapp, Jr. ................................ 710/128 |
| 4,580,213 | 4/1986 | Hulett et al. . |
| 4,583,160 | 4/1986 | Iguma . |
| 4,729,090 | 3/1988 | Baba . |
| 4,805,137 | 2/1989 | Grant et al. . |
| 4,979,100 | 12/1990 | Makris et al. ........................ 710/117 |
| 5,111,425 | 5/1992 | Takeuchi et al. . |
| 5,113,369 | 5/1992 | Kinoshita . |
| 5,185,694 | 2/1993 | Edenfield et al. . |
| 5,191,656 | 3/1993 | Forde, III et al. . |
| 5,195,185 | 3/1993 | Marenin ................................ 710/123 |
| 5,239,651 | 8/1993 | Sodos . |
| 5,253,348 | 10/1993 | Scalise . |
| 5,255,378 | 10/1993 | Crawford et al. . |
| 5,280,598 | 1/1994 | Osaki et al. . |
| 5,388,227 | 2/1995 | McFarland . |
| 5,394,528 | 2/1995 | Kobayashi et al. . |
| 5,396,602 | 3/1995 | Amini et al. . |
| 5,423,020 | 6/1995 | Vojnovich . |
| 5,428,763 | 6/1995 | Lawler . |
| 5,438,666 | 8/1995 | Craft et al. . |
| 5,463,739 | 10/1995 | Albaugh et al. . |
| 5,471,639 | 11/1995 | Harrington . |
| 5,481,680 | 1/1996 | Larson et al. . |
| 5,506,969 | 4/1996 | Wall et al. . |
| 5,509,126 | 4/1996 | Oprescu et al. . |
| 5,528,767 | 6/1996 | Chen ........................................ 710/113 |
| 5,530,902 | 6/1996 | McRoberts et al. . |
| 5,533,205 | 7/1996 | Blackledge, Jr. et al. . |
| 5,546,548 | 8/1996 | Chen et al. . |
| 5,548,786 | 8/1996 | Amini et al. . |
| 5,548,793 | 8/1996 | Sprague et al. . |
| 5,566,345 | 10/1996 | Ostrowski . |
| 5,805,905 | 9/1998 | Biswas et al. ........................ 710/244 |
| 5,884,051 | 3/1999 | Schaffer et al. ...................... 710/107 |

OTHER PUBLICATIONS

Barnaby et al., "Patent Disclosure: Priority Encoding and Decoding for Memory Architecture", Invention Date: Jan. 23, 1996; Document Date: Oct. 8, 1996; pp. 1–14.

*Primary Examiner*—Ayaz R. Sheikh
*Assistant Examiner*—Rupal D. Dharia
*Attorney, Agent, or Firm*—Rabin & Champagne, P.C.

[57] ABSTRACT

A shared resource access priority encoding/decoding and arbitration scheme takes into account varying device requirements, including latency, bandwidth and throughput. These requirements are stored and are dynamically updated based on changing access demand conditions.

7 Claims, 4 Drawing Sheets

| PRIORITY REGION | CLIENT REQUESTS PRE-EMPTION OF AN ACTIVE TASK | CLIENT ALLOWS PRE-EMPTION OF ITS ACTIVE TASK |
|---|---|---|
| 0 | NO | YES |
| 1 | YES | YES |
| 2 | YES | NO |

```
1          ; ram type (1=SDRAM, 2=EDO, 3=BEDO)
100        ; RAM Speed (SDRAM=MHz, EDO=ns, BEDO=ns)
7          ; number of clients
1.5e-5     ; interval of BW measurement (seconds)
1.5e-9     ; burst clock period (reference clock)
; client 1 - Video Refresh (scan buffer)
32         ; burst length in quad-words
4          ; number of bursts per BW sample interval
f          ; type of error (f=point of failure, p=performance, n=none)
4e-6       ; Point of failure (max latency/pending request)
16         ; base priority
; client 2 - YUV input
32         ; burst length in quad-words
8          ; number of bursts per BW sample interval
f          ; type of error (f=point of failure)
1.6e-5     ; Point of failure (max latency/pending request)
14         ; base priority
; client 3 - Hardware Cursor
4          ; burst length in quad-words
1          ; number of burst per BW sample interval
f          ; type of error (f=point of failure)
1.2e-5     ; Point of failure (max latency/pending request)
12         ; base priority
; host read
4          ; burst length in quad-words
61         ; number of bursts per BW sample interval (max)
p          ; type of error (p=performance impact)
0          ; Point of Performance Impact (latency before performance impact)
8          ; base priority
; host write
16         ; burst length in quad-words
49         ; number of bursts per BW sample interval (max)
p          ; type of error (p=performance impact)
6e-7       ; Point of Performance Impact (latency before performance impact)
6          ; base priority
; pci
4          ; burst length in quad-words
9          ; number of burst per BW sample interval (max)
N          ; type of error (N=No Impact)
0          ; No unit of error
4          ; base priority
; graphics/VGA
8          ; burst length in quad-words
54         ; number of bursts per BW sample interval (max)
p          ; type of error (N=No Impact)
1.2e-7     ; Point of Performance Impact (latency before performance impact)
2          ; base priority
```

FIG. 4

PRIORITY ENCODING AND DECODING FOR MEMORY ARCHITECTURE

BACKGROUND OF THE INVENTION

Field of the Invention

The invention relates to control of access to a shared resource and, in particular, to a complex-memory-core priority and arbitration scheme to enhance burst performance to and from a common (shared) hardware resource, e.g., DRAM, arbitrating multiple bus devices supporting DMA (direct memory access), including bus devices supporting real-time data transfers, to one memory resource control and data path.

The invention further relates to a priority architecture that allows for the determination of latency and bandwidth requirements of all supported bus devices, and the storing of the results in hardware registers. The registers are programmable, and may be changed based on bandwidth requirements, e.g., a change in video resolution or for enabling a faster SCSI device on a PCI bus.

Background Information

There are many patents in the field of memory arbitration directed to optimizing bus usage. For example, U.S. Pat. No. 5,423,020 "APPARATUS AND METHOD FOR OPTIMIZING BUS USAGE BY VARYING THE AMOUNT OF DATA TRANSFERRED ON A DMA OPERATION." This patent relates to a system including a DMA controller for dynamically varying the size of DMA transfers. The controller includes means for buffering data blocks from the device as they arrive and means for dynamically activating a DMA operation and for varying the amount of data transferred on a DMA operation depending on the recent arrival rate of data and the amount of data already buffered for DMA transfer. It provides a technique for achieving efficient bus usage for DMA operations by dynamically varying the amount of data transferred on a DMA operation based on the amount of buffered data awaiting transfer and the recent data rate of arrival. The system includes a processor, a main memory, one or more peripheral devices and a DMA controller. A system bus interconnects the processor, memory and the DMA controller. The controller improves bus usage during direct memory access transfers of data blocks by dynamically varying the size of DMA transfers. The controller includes means for buffering data blocks from the device as they arrive and means for dynamically activating a DMA operation and for varying the amount of data transferred on a DMA operation depending on the recent arrival rate of data and the amount of data already buffered for DMA transfer.

A representative embodiment of this patent is in a system including a processor, a memory, one or more peripheral devices, a direct memory access controller including a buffer for buffering data blocks from the peripheral devices, and a bus interconnecting the processor, memory and controller, wherein data blocks arrive for buffering at a data rate which varies between a high rate and lower rates. A bus request arrangement is connected to the peripheral devices and to the direct memory access controller for improving bus efficiency during direct memory access transfers by dynamically varying how many data blocks transferred on each direct memory access transfer between the peripheral devices and the memory. The bus request arrangement includes counting means for counting a total number of buffered data blocks in the buffer, measuring means for measuring a variable interval of time between consecutive data blocks arriving for buffering, and means, including the direct memory access controller responsive to the measuring means and the counting means, for selectively transferring on a single transfer on the bus a variable number of buffered data blocks from the buffer to the memory, in order to increase bus efficiency by increasing the variable number of data blocks transferred on a direct memory access transfer as the interval decreases and the total number of buffered data blocks increases.

Another U.S. Pat. No. 5,438,666 "SHARED MEMORY BUS SYSTEM FOR ARBITRATING ACCESS CONTROL AMONG CONTENDING MEMORY REFRESH CIRCUITS, PERIPHERAL CONTROLLERS, AND BUS MASTERS" relates to an arbitration system for a shared address, data and control bus that provides burst mode operations for transferring data between a peripheral device and memory via a bus master. The arbitration system is responsive to high priority bus activities, such as memory refresh cycles and DMA cycles to temporarily transfer control of the shared bus from the bus master to a circuit controlling the high priority activity. The arbitration system further includes timing circuits to assure that a bus master transferring data in the burst mode does not retain control of the shared bus for an excessive amount of time. The patent is directed to overcoming disadvantages of a "cycle stealing" system where the memory refresh operation uses a shared bus, in particular, excessive time overhead, burst mode transfer limitations in performing DMA. The object is to provide faster and more efficient access to the shared address, data and control bus while maintaining the operational integrity of the microprocessor based computer system. The bus arbitration circuit of the system includes logic for protecting the integrity of the shared bus so as to prevent a bus master from obtaining access to the shared bus and retaining control of the shared bus to the exclusion of the microprocessor. As one form of protection, the bus arbitration circuit monitors interrupt requests to the microprocessor and grants control of the shared bus to the microprocessor so that the microprocessor can service the interrupt requests.

In operation, this bus arbitration circuit monitors a signal indicative of the completion of interrupt servicing by the microprocessor, and, when the interrupt servicing is complete, grants control of the shared bus to a requesting bus master having the highest current priority (by re-arbitrating pending bus requests). The bus arbitration circuit includes additional logic for providing "fair" access to the shared bus by the microprocessor. When a bus master has been granted access to the shared bus, a watchdog timer is set that generates a signal after a predetermined amount of time has elapsed. The predetermined amount of time is sufficient to permit the bus master to transfer bursts of data to or from the memory via the shared bus, thus reducing the time overhead problem. When the predetermined amount of time has elapsed, the bus arbitration circuit will withdraw the grant of the shared bus to the currently controlling bus master. After the microprocessor has used the bus to execute instructions, the arbitration circuit will arbitrate the pending access requests from the bus masters, and, if more than one bus master is requesting access to the shared bus, will grant access to the bus master having the current highest priority. In some embodiments, the access priority among the bus masters is rotated (changed) each time a bus master is granted access to the shared bus so that the bus master currently having control of the shared bus has the lowest priority when the arbitration circuit next arbitrates access to the shared bus by the bus masters.

A representative embodiment of this patent is a bus arbitration control circuit for a computer system having a microprocessor, a system memory and a shared bus between the microprocessor and the system memory. The computer system further includes a memory refresh control circuit that uses the shared bus to periodically refresh the system memory and a plurality of peripheral controllers that utilize the shared bus to transfer data between the system memory and a plurality of peripheral devices. The bus arbitration control circuit arbitrates control of the shared bus between peripheral controllers having active requests to access the shared bus. The arbitration control unit has a plurality of inputs that receive requests for access to the shared bus from the peripheral controllers and the memory refresh control circuit; and a logic sequencer responsive to the plurality of inputs, the logic sequencer causing a first peripheral controller having control of the shared bus to relinquish control and temporarily transfer control of the shared bus to the memory refresh control circuit when the refresh control circuit requests access to the shared bus, the logic sequencer always automatically returning control of the shared bus to the first peripheral controller when the refresh control circuit has completed refreshing the memory so that the first peripheral controller can complete its operation without an arbitration of priority between the first peripheral controller and other peripheral controllers having active bus requests.

In another U.S. Pat. No. 5,463,739 "APPARATUS FOR VETOING REALLOCATION REQUESTS DURING A DATA TRANSFER BASED ON DATA BUS LATENCY AND THE NUMBER OF RECEIVED REALLOCATION REQUESTS BELOW A THRESHOLD," a method is described for managing a data transfer between a first device and an allocated portion of common memory, which includes receiving a reallocation request of the allocated portion of common memory from a second device, receiving a veto of the requested reallocation from the first device, and delaying the reallocation request. In addition, a method for transferring data between a peripheral device and a common memory in a virtual memory system is described, which includes instructing the peripheral device to transfer data with an allocated portion of the common memory, requesting a reallocation of the allocated portion of the common memory, and receiving a veto of the requested reallocation from the peripheral device in response to the instructed data transfer. In operation, the arbitration device decides whether to cause a retry by determining whether a data transfer can be completed within an acceptable period of time with regards to system bus interrupt latency.

In U.S. Pat. No. 5,481,680 "DYNAMICALLY PROGRAMMABLE BUS ARBITER WITH PROVISIONS FOR HISTORICAL FEEDBACK AND ERROR DETECTION AND CORRECTION," an arbitration circuit is described that uses a unique history register that is combined with a value representing bus requests, to index into a table. All possible combinations of history register requests are stored in the table, along with a corresponding grant. A block of the table is selected by the history register, and then the request is used to index into the block to determine which request receives a grant. The grant is then shifted into the history register. More than one table may be stored in memory which can be selected by an arbiter controller. This patent deals with a problem in the art wherein there was no bus usage arbiter that provided a dynamic priority scheme with provisions for historical feedback in its grant selection. This problem is dealt with in the patent by an arbitration circuit which takes into account previous bus access as part of the decision to service a requester. In particular, it provides a unique history register that generates a value representing past bus requests, which is combined with a value representing current bus requests, to access a location in memory. A potential grant is defined and stored in each location in memory for each possible combination of historical requests and current requests. Selection of a potential grant is achieved by using the history register contents as the high order bits of memory address, and using the current request as the low order bits of the memory address, in order to determine the one grant output to be awarded. The grant is also shifted into the history register. More than one table may be stored in memory to selectively provide a plurality of algorithms. The patent describes and claims a method for providing arbitration of bus allocation requests from a plurality of requesters based on the history of a plurality of prior bus request grants, having steps including receiving a plurality of requests for use of the bus; responsive to the plurality of requests, applying a history register containing the plurality of previous grants in sequential order to the plurality of requests to determine a selected arbitration's state; using the selected arbitration state as an index into an arbitration state table, the arbitration state table having a plurality of arbitration's states and a corresponding plurality of grants; and issuing one of the plurality of grants directly indexed by the selected arbitration state to the requesters.

U.S. Pat. No. 5,506,969 "METHOD AND APPARATUS FOR BUS BANDWIDTH MANAGEMENT,"illustrates in FIG. 3 a flow diagram for a bus bandwidth management method is illustrated. In block 300, a client application issues a transfer request for data transfer to a bus manager on a high-speed bus. The transfer requests include information defining the module containing data for transfer (the source module), the module or modules that contain the memory area to receive the data transfer (the destination module), a description of a two dimensional region of memory containing data for transfer, a description of a two dimensional memory region for receiving the data transferred, and both importance and urgency information associated with the particular transfer request.

In one embodiment, a Time Driven Resource Management (TDRM) policy is used. In general, the TDRM policy involves an attempt to schedule all outstanding transfers in the shortest-deadline-first order based on the urgency information. A test for a bus overload condition is performed, and if a bus overload condition is determined to be present, the servicing of selected transfer requests is deferred. A representative embodiment of the patent includes scheduling transfer requests for use of the bus based on a bus management policy including the steps of generating an importance list and an urgency list for each transfer request based on urgency and importance information; determining whether the bus has enough bus bandwidth to service the transfer requests on the urgency list within a deadline specified for each transfer request; generating a transfer order corresponding to the urgency list when the bus has enough bus bandwidth to service the transfer requests; and re-ordering the urgency list, when the bus does not have enough bus bandwidth, to service the transfer requests by removing transfer requests having low priorities until the bus has enough bus bandwidth to service the remaining transfer requests.

U.S. Pat. No. 5,509,126 "METHOD AND APPARATUS FOR A DYNAMIC, MULTI-SPEED BUS ARCHITECTURE HAVING A SCALEABLE INTERFACE" relates to a bus architecture communications scheme for enabling communications between a plurality of devices or nodes in a computer system, and more particularly, to a dynamic, multi-speed bus architecture capable of performing data packet transfers at variable and upgradable speeds between fixed speed and multi-speed nodes. The patent describes a way of overcoming disadvantages of bus architectures where each node in the system plugs into the bus to be connected to each of the other nodes in the system. A data packet transmitted on this type of shared bus by a particular node is available for reception by all other nodes coupled to the bus such that the data packet transfers must be performed at a fixed speed based on the speed of the slowest node. The fixed speed of the data packet transfers on a particular bus must be defined prior to implementation of the bus itself since it is dependent upon the technological capability of the nodes at the time. Therefore, the patent's objective is to implement a true dynamic, multi-speed bus having the capability of upward compatibility with newer and faster nodes while providing an optimum, cost-performance system implementation, where new nodes can coexist with the old nodes, and that will accommodate speed upgrades with a minimum of complexity (minimum cost, minimum design effort and minimum upgrade time). As the patent states it, the object is to provide a method and apparatus for a scaleable, multi-speed bus architecture which enables variable speed data packet transfers between newer, faster speed nodes and older, slower speed nodes coupled together via at least one variable speed, fixed size link forming a single interconnection of the multi-speed bus. As shown in FIG. 2 of the patent, a fixed speed Fs, variable size Vz, variable length VL interface (referred to as the bus Y) having scaleable capabilities is provided between a first module 21 and a second module 22 implemented in each node 3 between the local host 25 and the multi-speed link z. The second module 22 has a plurality of external ports 7 for interconnecting a plurality of other nodes 3 via a plurality of multi-speed serial lines z, a bus arbiter 55 for arbitrating among the various nodes 3 on the multi-speed serial bus, and an internal bus I for the transfer of control information between the controller 50 and the bus arbiter 55. The bus arbiter 55 includes a speed signaling circuit 59 for the transmission and reception of speed messages. To inform the controller 40 of the speed at which the third data packet CC will be transmitted onto the link Z, a speed message with this information must be transmitted from the local host 25 to the controller 40 prior to receipt of the first data packet AA. The speed message is then subsequently transmitted to the speed signaling circuit 59 of the second module 22 in order that it can be placed on the link Z for transmission to the adjacent relaying nodes 3 coupled to the other end of the links Z. Through the use of this speed information, the controller 40 can determine the size of the second data packet BB by dividing the value of the third data packet's speed with the value of the fixed speed of the bus Y. To request the bus, or to access a register, a short serial stream of data bits is sent on a request line. The information sent includes the type of request, the speed at which the data packet is to be sent, and an optional read or write command.

A method and system for efficient bus allocation in a multimedia computer which includes a processor, a memory and multiple input/output devices coupled together via a bus which has a maximum data transfer rate is described in U.S. Pat. No. 5,533,205 "METHOD AND SYSTEM FOR EFFICIENT BUS ALLOCATION IN A MULTIMEDIA COMPUTER SYSTEM." The transfer of audio, video or other time sensitive data within the computer system to various presentation devices must be accomplished at certain predetermined rates in order to support selected applications. An arbitration level indicator is utilized to indicate a priority of bus access associated with each presentation device which may contend for bus access. During selected time intervals, the arbitration level indicators associated with a particular presentation device are temporarily reordered to guarantee bus access at the required data rate. FIG. 3 of this patent provides a pictorial representation of time interval allocation of arbitration level indicators in accordance with the method and system of the patent. In operation, if the maximum data transfer rate for the bus is twenty megabytes per second, for example, and the particular input/output device assigned Arbitration Level 6 (A6) requires a data transfer rate of four megabytes per second, then every fifth interval within a frame will be allocated to that arbitration level. The percentage of bus bandwidth which is available for input/output devices will depend upon arbitration overhead and latency times; however, this example demonstrates a uniform distribution over time within each frame. With reference to the patent FIG. 3, the system stores within high speed memory, an indication of which Arbitration Level is to be given the highest bus priority within a given interval within each frame of time on bus 36. The patent provides a technique where a stored ordered list of Arbitration Level indicators associated with particular input/output devices may be selectively and temporarily reordered during particular intervals of time, in order to guarantee a particular input/output device access to the bus at a predetermined data rate.

U.S. Pat. No. 5,546,548 "ARBITER AND ARBITRATION PROCESS FOR A DYNAMIC AND FLEXIBLE PRIORITIZATION" relates to a programmable arbiter providing for dynamic configuration of prioritization implemented using a simple scheme. Arbiter banks are structured in a cascading manner. Each arbiter bank receives a predetermined number of the set of bus requests to be arbitrated. Each bank is separately programmed to provide a rotating or fixed priority scheme to evaluate the priority of bus requests. By separately programming the arbiter banks to operate in a fixed priority or in a rotating priority manner, a flexible, programmable arbiter is created which can operate according to a fixed, rotating or hybrid priority scheme adaptable to a variety of applications. An arbiter configuration register is provided for storage of the control signals used to control the banks. FIG. 4c illustrates a configuration register to support the arbiter structure illustrated in FIG. 4a. In another embodiment, the arbiter can be configured to dynamically override the priority scheme programmed, for example, by the values stored in the arbiter configuration register. Thus, the priority can be changed without affecting the state of the register. According to another aspect of the patent, in order to prevent the reissuing of multiple retry requests while waiting for slower bus 510 to be released for access to save the bandwidth of the high speed bus 500, the priority for the CPU is modified temporarily, such that the request is masked in order to eliminate the trashing of requests. Alternately, the priority is modified to be of a lower priority. The bus arbiter will maintain a watch on the buses 510, 500, such that when the slower bus 510 is released, the priority of the CPU is again modified to its predetermined priority so that subsequent retries will be attempted and subsequently granted.

U.S. Pat. No. 3,283,308 "DATA PROCESSING SYSTEM WITH AUTONOMOUS INPUT-OUTPUT CONTROL" relates to regulating the flow of data between a memory subsystem and an individual channel buffer register via an input-output master control, regulated by a channel priority access control. An embodiment of the channel priority access control assigns a predetermined priority access to each channel, e.g., channel No. "0" has the lowest priority; channel No. "1" the next higher priority, and so on. Thus, the slowest peripheral units are connected to the lowest priority channel; and, correspondingly, the highest-speed peripheral units are connected to the highest priority channel. The channel priority register is an eight stage register having three output leads designating in binary code the activated stage of the register. In operation, if there is a signal on lead upon occurrence of a clock pulse, a priority register registers "seven" in binary code. No other stage may be set ON since the signal on lead, after inversion by an inverter, blocks closing of each of the succeeding AND gates. In a similar manner, any higher priority channel will block those below it by identical logic gating elements. Representative embodiments in the patent include means for regulating the flow of data between the memory subsystem and the peripheral data transmitting and receiving devices, so that the devices having the highest data rates are automatically afforded the highest priority use of the memory subsystem; means for regulating the flow of data between the memory and the peripheral data transmitting and receiving devices, so that the devices having the highest data rates are automatically afforded the highest priority use of the memory; a channel priority access control for regulating access of each of the channel control units to the memory subsystem, having a channel priority register responsive to a plurality of inputs corresponding to each of the channels and adapted to register a count corresponding to the channel requesting access to the memory subsystem; gating means connected between the channels and the register inputs, so that an access request from a higher priority channel will block access requests from lower priority channels; the combination of: peripheral data transmitting and receiving devices, a channel control unit for selectively coupling the peripheral devices to a memory subsystem; means for selectively terminating the data exchange between the selected peripheral device and the memory subsystem by resetting the channel control unit and disconnecting the peripheral device when the end of the memory buffer area is utilized for a data exchange (when the current address equals the end address) or cyclically continuing the data exchange by utilizing the start address as the current address for the data exchange immediately succeeding the end address.

U.S. Pat. No. 4,580,213 "MICROPROCESSOR CAPABLE OF PERFORMING MULTIPLE BUS CYCLES" relates to a implementation of a microprocessor bus controller.

U.S. Pat. No. 4,583,160 "PRIORITY CONTROL APPARATUS FOR A BUS IN A BUS CONTROL SYSTEM HAVING INPUT/OUTPUT DEVICES" relates to providing a bus control system which allows the continuous use of a bus by a high speed data processing unit until interruption of usage of the bus by a higher priority processing unit, such as a hardware operation unit, until interruption of usage of the bus by higher priority input/output units. The high speed processing unit for the bus data is given a lower priority for the use of the bus than other units. While the high speed processing unit is processing the bus data, the use of the bus by a data processing unit which executes instructions is suppressed, so that the high speed processing unit is given a higher priority than the data processing unit. When an interruption request is issued by another unit, the high speed processing unit to which the interruption request is issued interrupts the high speed processing of the bus data. After the interruption processing by the data processing unit has been completed, the high speed processing of the bus data is reinitiated by a reinitiation request from the data processing unit. The priority for the use of the bus is given in the following order from highest priority to the lowest priority to the I/O devices, the hardware operation unit and the data processing unit, and the use of the bus by the data processing unit is suppressed during the continuous processing operation of the hardware operation unit, in order to allow high speed processing of the operation unit.

U.S. Pat. No. 4,729,090 "DMA SYSTEM EMPLOYING PLURAL BUS REQUEST AND GRANT SIGNALS FOR IMPROVING BUS DATA TRANSFER SPEED" relates to a common data bus for transferring data among components and provides a flag register indicating whether or not the CPU is using the bus.

U.S. Pat. No. 4,805,137 "BUS CONTROLLER COMMAND BLOCK PROCESSING SYSTEM" relates to a real-time bus system controller chip for a bus system with strict time constraints for terminal response.

U.S. Pat. No. 5,111,425 "SINGLE CHIP COMMUNICATION DATA PROCESSOR WITH DIRECT MEMORY ACCESS CONTROLLER HAVING A CHANNEL CONTROL CIRCUIT" relates to a DMA controller for use with a communication control unit, e.g., an ISDN, which uses registers to store transfer parameters and has a control circuit to control the registers.

U.S. Pat. No. 5,113,369 "32-BIT PERSONAL COMPUTER USING A BUS WIDTH CONVERTER AND A LATCH FOR INTERFACING WITH 8-BIT AND 16BIT MICROPROCESSORS" relates to an integrated circuit for converting between 8, 16 and 32 bit bus widths in a microprocessor system.

U.S. Pat. No. 5,185,694 "DATA PROCESSING SYSTEM UTILIZES BLOCK MOVE INSTRUCTION FOR BURST TRANSFERRING BLOCKS OF DATA ENTRIES WHERE WIDTH OF DATA BLOCKS VARIES" relates to using burst mode transfers of data onto a systems bus in a loosely coupled system using the MOVE command and provides wide registers to accommodate the data.

U.S. Pat. No. 5,191,656 "METHOD AND APPARATUS FOR SHARED USE OF A MULTIPLEXED ADDRESS/DATA SIGNAL BUS BY MULTIPLE BUS MASTERS" relates to a central arbitration unit which controls access to a shared bus to reduce latency in a pended bus arrangement.

U.S. Pat. No. 5,239,651 "METHOD OF AND APPARATUS FOR ARBITRATION BASED ON THE AVAILABILITY OF RESOURCES" relates to a method and apparatus for arbitrating among multiple requested data transfers based on the availability of transfer resources. A request for the control of a resource is transmitted to an arbiter with information regarding the size of data transfer, internal buses and external buses required. The arbiter compares the information with the space remaining in the buffer, internal bus availability and external bus availability. If all the resources are available to complete the request, then the request is granted arbitration, and the requested transfer is started.

U.S. Pat. No. 5,253,348 "METHOD OF ARBITRATION FOR BUSSES OPERATING AT DIFFERENT SPEEDS" relates to arbitration of bus access to prevent concurrent bus grants in a system with busses of different speeds.

U.S. Pat. No. 5,255,378 "METHOD OF TRANSFERRING BURST DATA IN A MICROPROCESSOR" relates to improving efficiency of burst data transfers by implementing a burst ordering scheme.

U.S. Pat. No. 5,280,598 "CACHE MEMORY AND BUS WIDTH CONTROL CIRCUIT FOR SELECTIVELY COUPLING PERIPHERAL DEVICES" relates to connecting busses of different widths using a bus width control circuit in a cache memory.

U.S. Pat. No. 5,388,227 "TRANSPARENT DATA BUS SIZING" relates to handling communications between busses of different widths.

U.S. Pat. No. 5,394,528 "DATA PROCESSOR WITH BUS-SIZING FUNCTION" relates to controlling communication between busses of different widths using memory boundary sizing.

U.S. Pat. No. 5,396,602 "ARBITRATION LOGIC FOR MULTIPLE BUS COMPUTER SYSTEM" relates to an arbitration mechanism which includes sideband signals which connect the first and second levels of arbitration logic and include arbitration identification information corresponding to the selected standard I/O device. Access to base system memory is controlled by the memory controller via base system memory bus. If the I/O operation is destined for a primary PCI device, the PCI host bridge responds with a decode command to the memory controller, and passes the I/O cycle to the appropriate primary PCI device.

Referring to FIG. 2 of the patent, the implementation used when no standard bus bridge is present includes a bank arbitration control point (BACP), a PCI arbitration control point (PACP), and a direct-attached arbitration control point (DACP). The BACP arbitrates between requests by the PACP and the DACP for control of the primary PCI bus. The PACP manages primary PCI bus access requests presented to it by the CPU and the primary PCI devices (collectively "BANK0 requests"). The DACP handles primary PCI bus requests presented to it by the I/O controller on behalf of the peripheral I/O devices which it controls. The hierarchical architecture provides an arbitration scheme for the system wherein arbitration between the CPU and primary PCI devices is managed independently of arbitration between peripheral I/O devices controlled by the I/O controller, and standard I/O devices attached to the standard bus bridge (when present). The PACP receives requests for access to the PCI bus directly from up to five PCI devices and the CPU via five pins on the PACP. An arbitration priority is assigned to each of the primary PCI devices and the CPU. The priority levels may be determined based on the bandwidths of the PCI devices involved. For example, a PCI device possessing a high bandwidth and low buffering capability should be assigned a higher arbitration priority than devices having smaller bandwidths and/or higher buffering capability. A representative embodiment of the patent has a bi-level arbitration logic electrically connected to a second system bus, the bi-level arbitration logic comprising a first level of logic for performing arbitration on the I/O bus, wherein one of the individual I/O bus locations is selected from a plurality of the individual I/O bus locations competing for access to the standard I/O bus, and a second level of logic for arbitrating between the selected individual I/O bus location, the CPU and the at least one peripheral device, is selected to access the peripheral bus. The bi-level arbitration logic includes side-band signals directly connecting the first and second levels of arbitration logic, the sideband signals including arbitration identification information corresponding to the selected individual I/O bus location.

U.S. Pat. No. 5,428,763 "DIGITAL DATA APPARATUS FOR TRANSFERRING DATA BETWEEN A BYTE-WIDE DIGITAL DATA BUS AND A FOUR BYTE-WIDE DIGITAL DATA BUS" relates to control of data transfers between VME and SCSI busses.

U.S. Pat. No. 5,471,639 "APPARATUS FOR ARBITRATING FOR A HIGH SPEED DIRECT MEMORY ACCESS BUS" relates to an arbitration circuit in a DMA controller.

U.S. Pat. No. 5,530,902 "DATA PACKET SWITCHING SYSTEM HAVING DMA CONTROLLER, SERVICE ARBITER, BUFFER TYPE MANAGERS, AND BUFFER MANAGERS FOR MANAGING DATA TRANSFERS TO PROVIDE LESS PROCESSOR INTERVENTION" relates to a common buffer management scheme for a multiprocessor arrangement using data packet transfers.

U.S. Pat. No. 5,548,786 "DYNAMIC BUS SIZING OF DMA TRANSFERS" relates to a DMA controller that uses bus size control information to control data transfers over busses of different sizes.

U.S. Pat. No. 5,548,793 "SYSTEM FOR CONTROLLING ARBITRATION USING THE MEMORY REQUEST SIGNAL TYPES GENERATED BY THE PLURALITY OF DATAPATHS" relates to arbitrating among memory requests in a video signal processing system having parallel processors by assigning priority to request types.

U.S. Pat. No. 5,566,345 "SCSI BUS CAPACITY EXPANSION CONTROLLER USING GATING CIRCUITS TO ARBITRATE DMA REQUESTS FROM A PLURALITY OF DISK DRIVES" relates to using protocol standards to extend the number of devices to be connected to an SCSI bus.

Despite the number and variety of memory/bus arbitration schemes in the field, as exemplified by the above patents, there still exist problems with latency and bandwidth, especially in modern personal computers where high video resolutions are required.

Core-logic components deal with interfacing a central processing unit (CPU) device's local control and data busses to other busses, such as direct-memory-access RAM (DRAM), and I/O busses, such as peripheral component interconnect (PCI). A common requirement with core-logic devices implemented across different CPU architectures, is to allow multiple agents to access a shared resource, such as DRAM and PCI.

Prior implementations consider more of a fixed arbitration algorithm where a bus access client has a fixed priority. This approach does not lend itself to the flexibility needed with clients that change in bandwidth and latency demands, such as frame buffers and grabbers. The result with fixed algorithms is that they waste bandwidth when the demands are light by giving high priority devices the same bandwidth at all times when requested.

Devices in systems such as those just described, may implement a buffer to allow for some latency. However, based on changes in bandwidth demands, these devices do not allow for relaxing the latency requirements when the rate at which these buffers are filled or emptied, is reduced from a worst case design throughput.

The fixed algorithms do not take advantage of letting the CPU, or other performance devices, increase their burst length (continuing their burst) even when a high priority client makes a request, since there is no knowledge of how long the high priority client has been latent, or when the high priority client will fail.

Other approaches attempt some flexibility by providing bandwidth provisions at the client. For example, a real-time client may have multiple tap points to inhibit a request from being asserted until a threshold is reached. The problem with this approach is that this client is being inhibited from transfer when there may be idle time for it to transfer due to the other real-time or performance-driven devices being idle. This increases the probability that request contention will occur between clients in the future, since idle bandwidth was wasted previously. The present invention allows the client to always request access when it has data, and be granted access based on how much latency it has experienced while requesting the access.

PCI (Peripheral Component Interconnect) bus priority schemes have also been implemented using other resource sharing devices, such as memory controllers. PCI supports the concept of round-robin where each client or agent is given an equal and fair chance at being granted the bus for accessing devices, like system memory. Each agent implements its own programmable latency timer that limits the length of time can burst on the bus, once it is granted access.

The problem with this approach is that it uses the concept of a fixed threshold, or a number of fixed thresholds, for when an agent requests use of the bus. Some agents do not consider requesting the bus if it is lightly loaded or in use, and this is less efficient for bus usage when bandwidth demands reach "peaks and valleys." Agents which take advantage of the round-robin approach by always requesting, will waste bandwidth with short bursts when other agents may have more data, since all agents have equal priority in a round-robin approach.

SUMMARY OF THE INVENTION

In order to overcome the deficiencies of the prior designs and methods, the present invention provides a complex-memory-core priority and access arbitration scheme which enhances burst performance to and from a common (shared) hardware resource, e.g., DRAM. In particular, the invention provides a method of arbitrating multiple bus devices supporting DMA (direct memory access), including bus devices supporting real-time data transfers, to one memory resource control and data path. The invention provides a priority architecture that allows a software application to be written in order to calculate latency and bandwidth requirements of all supported bus devices, and programs the results in the form of hardware registers. The registers are programmable by software drivers, and may change based on bandwidth requirements, e.g., a change in video resolution or enabling a faster SCSI device on a PCI bus. The feature of calculating latency and bandwidth requirements and programming the results in registers, which can be dynamically changed.

The invention provides a method of arbitrating multiple agents (bus master devices supporting direct memory access or DMA), including agents that deal with real time data transfers, to one memory resource control and data path.

In one embodiment of the invention, it is implemented within one large application specific integrated circuit (ASIC) device functioning as the core-logic component for a personal computer (PC) using unified memory architecture (UMA). However, this invention could be implemented in any hardware architecture requiring access to one or more shared memory paths or channels, and is not limited to unified memory architectures alone. In fact, this invention is not limited to just DRAM, but may be applied to any application requiring a shared hardware resource.

In one embodiment, the invention implements a method by which multiple agents, or bus masters, with varying latency and throughput requirements are prioritized for access to a shared resource. Each agent is provided a means of counting a priority value based on the amount of time that an agent has experienced latency while asserting a pending request to perform a task to the shared resource. The count is incremented, starting from a base priority count, when the agent asserts a request to access the resource. An agent's priority increment rate changes based on how long the agent has been denied access to the resource.

The invention also supports multiple regions defining where the rate of priority count changes. These regions also define how agents are pre-empted by other pending tasks of higher priority, and how an agent requests the pre-emption of the current active task.

All values for agents (base priority count, rate of change of priority count, priority regions) are assumed to be programmable and are referenced by the resource controller, e.g., the resource controller being a memory core of a core-logic device controlling the shared access of a single DRAM control and data path.

Tying in the priority latency analysis tool and tightly coupling it to the arbitration scheme has the advantage of automating the programmable settings, and tuning the hardware based on varying client demands. Past arbitration schemes do not take advantage of this tuning capability.

According to one embodiment, a shared resource access system controls access by a plurality of devices to a shared resource, such as memory, the system comprising: a priority encoder which encodes priority values to resource access requests based on stored variables; a priority decoder which decodes and compares priority values of pending resource access requests and determines a winning request; an address decoder which decodes at least one address in the shared resource for pending resource access requests; an arbiter which arbitrates between a currently active resource access request and a winning request from the priority decoder and provides an output; and a resource controller which controls access to the shared resource based on the output from the arbiter; wherein the stored variables include at least one of: base priority values, latency values, bandwidth values, and throughput values.

In a preferred embodiment, the shared resource comprises memory. According to another aspect of the invention, the plurality of devices which request access to the shared resource include at least one of: a host core interface, a graphics accelerator, a video graphics array (VGA) controller, a video scan buffer, a hardware cursor, a YUV video input port, and a peripheral component interconnect (PCI) core interface.

The system may also include an error checker which checks access requests for errors, including at least one of requests to illegal resource addresses, protected resource addresses, and unmapped resource addresses.

In one embodiment, a programmable register file is provided which stores the variables, including at least one of: base priority, latency, bandwidth, and throughput.

According to another embodiment there is also provided a cache coherency check substage of the arbiter, which receives requests requiring cache coherency checking and holds such requests therein until either a miss or a hit with cache write-back occurs; a lock tagger substage of the arbiter, which tags any resource requests which are read-modify-write type requests and the address associated therewith; and a lock stalling substage of the arbiter, which stalls any requests for access to the resource address associated with a read-modify-write type request until after the write associated therewith has occurred.

According to another aspect of the invention, the arbiter latches data associated with the requests, the data including at least one of: a request address; a request type; a burst size; byte masks; a requesting device identifier; and RAS channel decode signals.

In one embodiment, the address decoder comprises a RAS channel decoder.

In another embodiment of the system, a request status multiplexor is provided which provides signals from the memory controller to a corresponding one of the devices; and a data multiplexor is provided which provides data to the shared resource from a corresponding one of the plurality of accessing devices.

A shared resource access method according to the invention, is for controlling access by a plurality of devices to a shared resource, such as memory, the method comprising: establishing access priority based on a determination of device resource requirements; and granting access to the shared resource based on the establishing of access priority; wherein the device resource requirements include at least one of: base priority, latency, bandwidth, and throughput.

The method according to another embodiment includes storing the device resource requirements; and dynamically changing the stored resource requirements based on changing conditions.

According to another embodiment of the invention, one of the plurality of devices is a video device having video resolution as a resource requirement which can change dynamically.

In another embodiment of the method according to the invention, one of the plurality of devices is a peripheral component interconnect (PCI) having SCSI device speed as a resource requirement which can change dynamically.

In another embodiment of the method according to the invention, preempting a current access to the shared resource based on a predetermined set of preemption rules is performed. According to another aspect of the invention, at least one of the devices is a real-time device, and the at least one real-time device gains access priority to the shared resource by the preempting of a current access of a lower priority.

Another embodiment includes dynamically changing device resource requirements based on system performance; wherein system performance includes device latency time; and wherein access priority is thereby dynamically changed.

Yet another embodiment includes establishing a priority curve for each of the plurality of devices; wherein a priority curve represents a change in priority count with respect to a change in latency time. According to one aspect of the invention, the priority curve for each device comprises a first priority region, a second priority region, and a third priority region; each of the first, second and third priority regions have a respective rate of change of the priority count with respect to latency time; and, in the first priority region, a device will permit preemption by another device but will not request preemption of another device; in the second priority region, a device will permit preemption by another device and will also request preemption of another device; and in the third priority region, a device will request preemption of another device but will not permit preemption by another device.

The method may also include classifying devices in performance categories; wherein the performance categories include: a point-of-failure type device where if a given latency tolerance is exceeded, a failure occurs; a performance sensitive type device where performance will be adversely affected if latency tolerance is exceeded; and a no-impact lower priority type device where there is less performance degradation if latency thereof is excessive. According to another aspect, priority is determined based on the performance categories by calculating priority curves for the point-of-failure type devices first, then calculating priority curves for the performance sensitive type devices considering the bandwidth remaining, and then calculating priority curves for the no-impact lower priority type devices considering the remaining bandwidth.

BRIEF DESCRIPTION OF THE DRAWINGS

FIG. 4 illustrates a sample program input file.

DETAILED DESCRIPTION OF THE PREFERRED EMBODIMENTS

Figure 1:
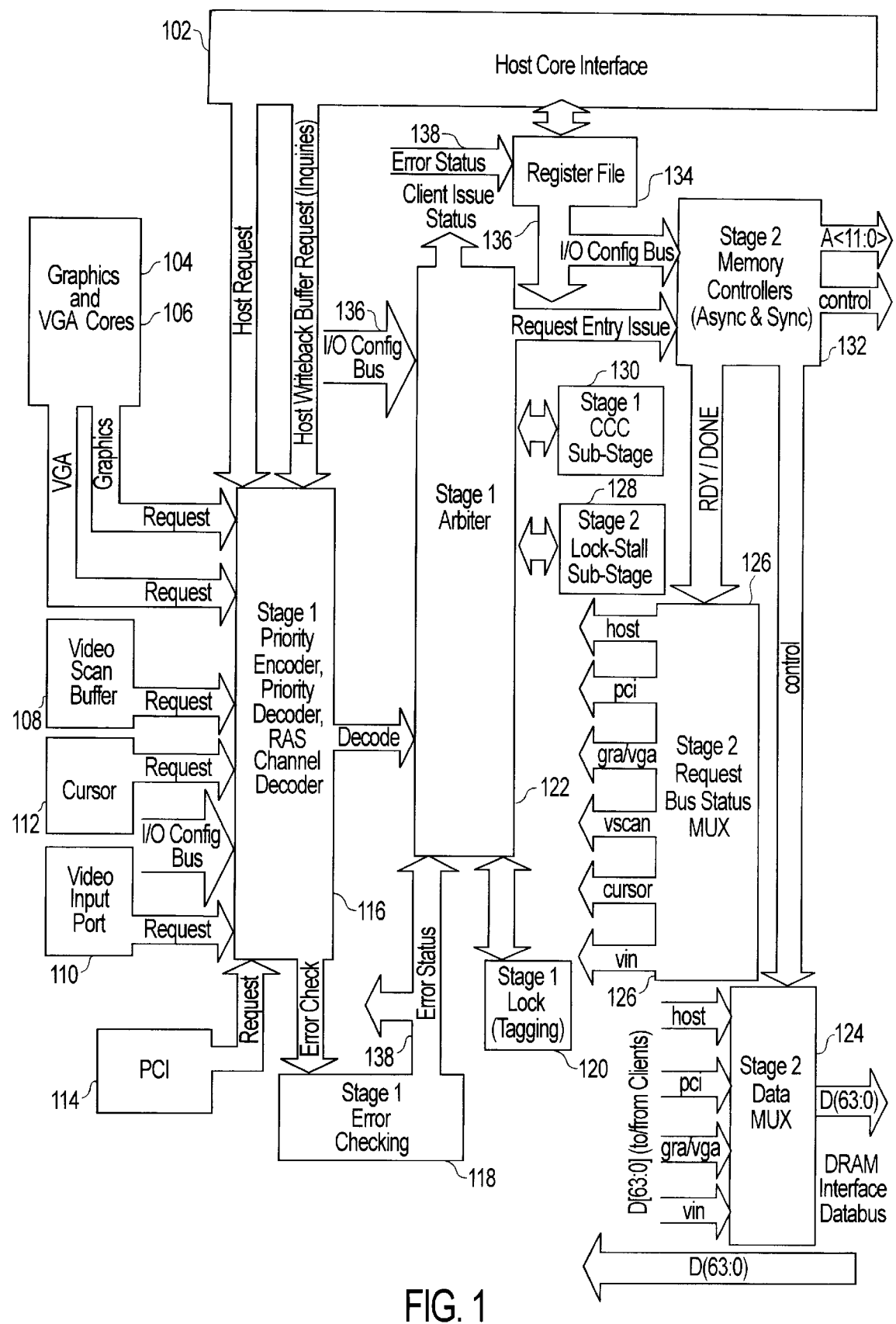
FIG. 1 is a block diagram of a memory core of a design implementing a priority scheme according to the invention.

Referring to FIG. 1, a block diagram of an implementation according to an exemplary embodiment of the invention is illustrated.

As viewed by the memory core, there are seven agents—in this example, all agents are called clients since the memory core is serving all requests to access a single memory resource. An example of a client might be a host CPU 102 such as an X86 microprocessor that requires separate read and write paths, a graphics controller 104, a VGA controller 106, a video scan buffer 108 accessing memory for display refresh, a real-time-YUV-multimedia port 110 (video input), a hardware cursor 112 or separate bit mapped image, or an I/O client, such as PCI 114.

The Stage 1 Priority Encoder, Priority Decoder, and RAS Channel Decoder is illustrated as block 116 in FIG. 1. It receives requests as shown from the various clients. Block 116 outputs an Error Check to Stage 1 Error Checking block 118, and a Decode to Stage 1 Arbiter 122.

Stage 1 Error Checking block 118 outputs Error Status to Stage 1 Arbiter block 122 and Register File block 134.

Stage 1 Lock (Tagging) block 120 exchanges signals with the Arbiter block 122, as do Stage 1 CCC Sub-stage block 130 and Stage 1 Lock-Stall Sub-stage block 128.

Arbiter block 122 is coupled to an I/O Config Bus.

Arbiter block 122 outputs Request Entry Issue to the Stage 2 Memory Controllers (Async & Sync) block 132.

Arbiter block 122 outputs Client Issue Status.

Stage 2 Memory Controllers block 132 outputs Control signals to Stage 2 Data MUX 124, which is coupled to the respective data busses of the clients, and to the DRAM Interface Databus.

Stage 2 Memory Controllers block 132 outputs RDY/DONE to the Stage 2 Request Bus Status MUX block 126, which in turn provides an output to each of the respective clients.

Stage 2 Memory Controllers block 132 is further coupled to the Register File block 134, the Arbiter block 122, and the Priority Encoder/Decoder/RAS Channel Decoder clock 116, by the I/O Config Bus.

The Register File block 134 is coupled to the Host Core Interface block 102.

In more detail, all memory clients interface to stage 1 of the memory core via a request bus. Illustrated clients include host core interface 102, graphics accelerator engine 104, VGA video controller 106, video-scan buffer 108, hardware cursor 112, YUV video input stream 110, and PCI core 114.

The request bus for each client provides for signaling a request by a client with a corresponding physical address, byte masks, burst size, type (read or write), burst order (linear, sequential, interleaved), read modify (lock the location(s) requested), sequence number and write data inputs. The request bus output signals from the memory core to the client include an issue indicator, error, read and write data ready, sequence number issued or ready and read data.

Respective clients may or may not support write or read buffering, based on latency sensitivity and burst size. Clients also are programmed with a separate register determining regions of memory deemed as cacheable which require cache coherency (snooping or inquire cycles) by the memory core. Sideband signals are provided between the host and stage 1 in order to perform synchronization of inquire (snoop) cycles, with the potential result being a cache invalidate if a requested memory location hits a modified cache line. Cache invalidations result in a writeback of the cache line which must be performed before the requesting client's access. Specifically, for memory core to host interface these sideband signals are: inquire cycle request and inquire address; and for host interface to memory core, they are inquire cycle acknowledge, hit modified, and not hit modified.

The I/O config bus 136, provides all programmable register file 134 outputs in parallel, such as arbitration related registers determining priority regions and rate of priority change, cacheable memory regions, memory protection regions, memory timing, memory types, RAS channel size regions, and interleave configurations between two memory RAS channels. All data is stored in register file 134.

Stage 1 priority encoder/decoder RAS channel decoder block 116 includes hierarchical operational blocks for performing priority encoding, priority decoding, and RAS channel (address) decoding. The priority encoder performs the priority count accumulation function as described herein, where a pending client request accumulates a priority count value based on register setups describing the rate of change of the priority count for priority regions 0 through 2. The priority encoder also signals preemption requests for pending clients based on the rules outlined for priority regions 0 through 2 for generating preemption for a given client.

The priority decoder compares all priority counts for pending client requests and indicates a winning client ID based on priority region rules for regions 0 through 2. In addition, the priority decoder indicates a preempt of an active stage 2 task based on preemption requests by the priority encoder, and rules for the 3 priority regions.

In parallel with the priority encoder and decoder of block 116, the RAS channel decoder (controller) asserts a RAS channel decode, for each of the pending client requests, based on the starting request address decode along with the configuration of the specific memory controller RAS channels as they relate to the memory map.

The stage 1 arbiter 122, in parallel with and based on determination of all hierarchical blocks of 116, latches a winning request after completion of a task by an active stage 2 memory controller 132. The latched request includes the request address type, burst size, byte masks, client ID and RAS channel decode signals. The latched signals are issued to the stage 2 memory controllers 132.

If a preemption occurs, the arbiter 122 stores the preempted task in a buffer along with the current outstanding burst size, and then issues the preempting task. Upon completion of the preempting task, the arbiter 122 restores the preempted task with a new base (address) and the outstanding burst size. Nested preemptions are supported. However, in the event of multiply preempted tasks, a task is restored based on its priority count after completion of the preempting task. Upon latching of any new request, the arbiter block 122 formally issues a request signal to the winning client.

Three substages to the arbiter are supported. The CCC (cache coherency checking) substage 130 is issued requests that require cache coherency checking, and remain in the CCC substage until either a miss or a hit with necessary cache line writebacks occur. The CCC substage is one request deep, and requests an inquire cycle to the host interface via sideband signals. The stage 1 lock (tagging) block 120 tags any read addresses requested as a read-modify-write access indicated on the request bus. Any subsequent requests to this location are stalled and issued to the stage 1 lock-stall substage 128 until a write cycle occurs from the locking client to the locked location.

The stage 1 error checking block 118 provides checking of requests to illegal, protected (including read only), and unmapped addresses. An error status bus 138 is mapped to the register file block 134 for reading of error status under software control, in addition to providing an error signal asserted to the offending client.

Stage 2 in this exemplary embodiment is comprised of two memory controllers 132, an asynchronous and a synchronous controller. The asynchronous controller, for this application, drives EDO DRAMs, while the synchronous controller drives SDRAMs/SGRAMs. Each controller has two channels, A and B, that may be interleaved for increased performance. The output of the controllers 132 are multiplexed driving the necessary DRAM control signals and address. Ready and done signals are generated for handshaking of data between the active client and the target memory controller, multiplexed by stage 2 request bus status MUX block 126 to the appropriate client. This block 126 deasserts the ready and done signals to clients that are idle or have requests pending.

Read data is provided directly from the DRAM interface data bus to all clients, with each respective client receiving its own read ready and done signals to indicate when read data is valid. Each writable client has its own write-data bus and is multiplexed by data MUX block 124 based on the active client, and controlled by the active memory controller. Write data is signaled as written by a write ready signal asserted by a memory controller, along with done.

In the above described exemplary embodiment, all clients access one memory resource making this implementation a unified memory architecture (UMA). The demands placed on this architecture require that clients with real time data accesses, such as the video input 110, hardware cursor 112 and video scan buffer 108 clients, have a predictable maximum latency to accessing a real time data stream, otherwise dropped video frames or display corruption may be the result.

Along with minimizing latency for real-time clients, read latency experienced by the host CPU 102 must be minimized in order not to stall the CPU's pipeline, and in turn, have a negative effect on performance.

All of the latency requirements are opposed by the fact that long data bursts with memory architectures are desired to achieve maximum data bandwidths. For example, with extended data output (EDO) DRAMS and synchronous DRAMS (SDRAMS), the more data bursts that occur with an open page, the greater that throughput. However, the longer the data bursts, the longer latency is experienced by all clients with pending requests (tasks).

There is a problem with managing latency versus burst performance, in addition to guaranteeing that real time clients are provided the proper bandwidth and latency requirements in order to avoid dropped frames or interrupt refresh data.

The advantage of unified memory architecture (UMA) is cost savings by having only one memory resource shared by all clients, and not requiring a separate frame buffer for the display. This becomes even more of an advantage with support of 3D, true-color, and high video resolutions such as 1280×1024, requiring large frame-buffers.

Furthermore, the UMA architecture provides fast data paths between real time video clients and the system memory subsystem, and provides high levels of integration for portable applications such as notebooks and personal data assistants (PDA).

Client Priority Curves

The invention implements a priority architecture that allows calculating latency and bandwidth requirements of all supported clients, and programming the results in the form of hardware registers supported within the invention. These registers are programmed by software drivers, and may change based on bandwidth requirements for each client, such as the change in video resolution or pixel depth, or enabling a faster SCSI device supported on PCI.

FIG. 1 illustrates an exemplary embodiment of the invention, and some important items to be considered are: the programmable values stored in the register file, the priority counts and pre-emption flags for each client supported within the priority encoder, and the control of the winning (active) task provided by the priority decoder.

Figures 2, 3:
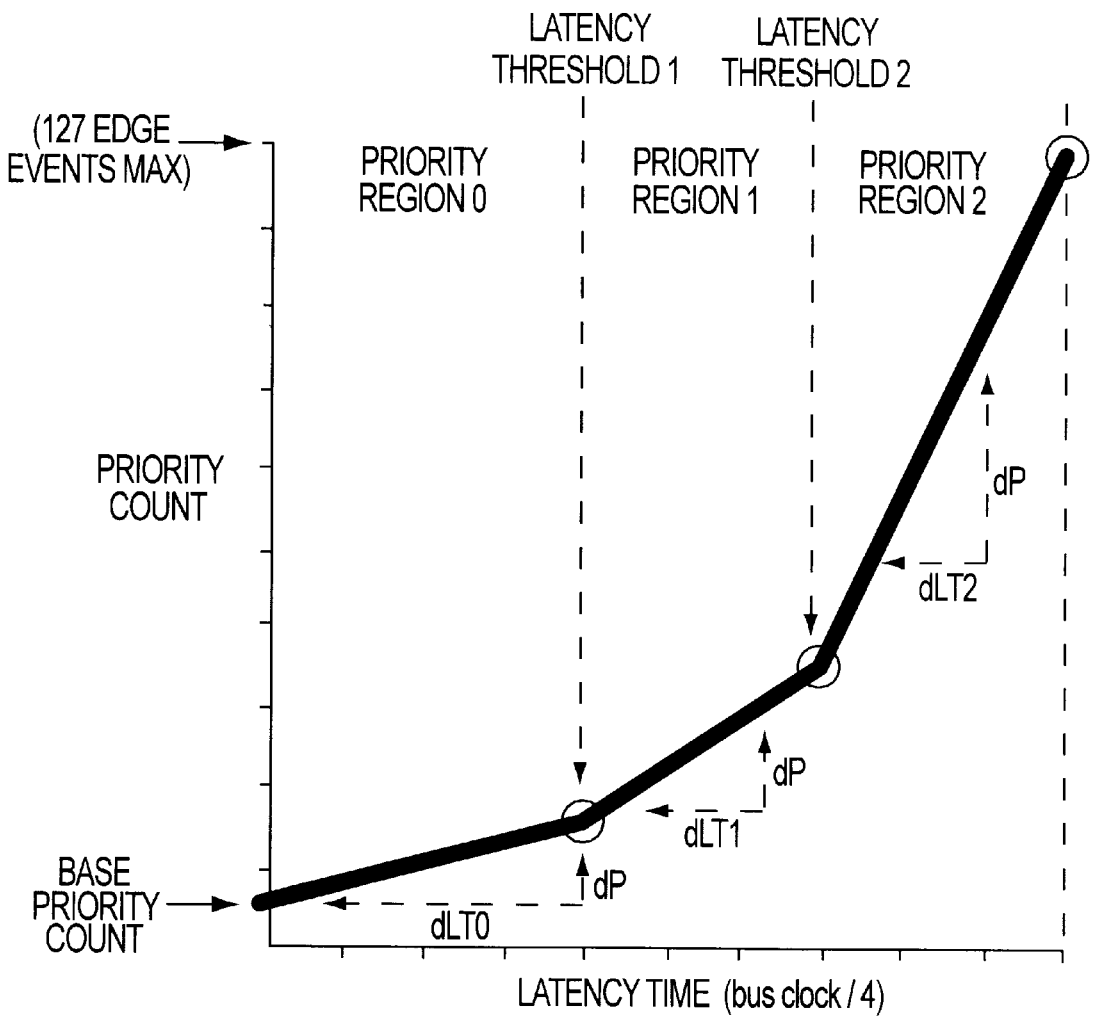
FIG. 2 is a priority graph illustrating the priority counts and how they relate to priority thresholds and regions within the implementation according to FIG. 1.
FIG. 3 illustrates an outline of a set of pre-emption rules implemented with the priority curve presented in FIG. 2.

Referring to FIG. 2, for this exemplary embodiment of the invention, priority for each client is plotted as change in priority count (Y axis) with respect to the change in latency time (X axis). Each client owns its own priority curve. The curve is further broken up into three priority regions labeled region one, two and 2. The beginning of priority region 0 starts with a hardware register defining a base priority count value with respect to latency time, which is some finite integer for priority count, and zero for latency time. The two addition priority regions (1 and 2) are defined with priority threshold registers 1 and 2—these registers are programmed with binary values representing a count of latency in clocks or divide clocks (to minimize storage bits) defining the start of the corresponding priority region—the registers are programmed based on what latency time will place a given client within the defined priority region, and compared to the clients' priority count to determine if the region is entered.

A priority region has two significant boundary definitions. First, it defines a rate at which priority is accumulated, and second it defines if a client's task will pre-empt another task, or will be pre-empted for a higher priority request. Pre-empting tasks is another tool in guaranteeing success with real time clients achieving latency and bandwidth goals.

For this example, FIG. 3 outlines a set of pre-emption rules to implement with the priority curve presented in FIG. 2. Again, each one of the clients would implement its own pre-emption rules based on its priority curve. Column one outlines the priority region that the client is currently in; column two outlines whether a client will request a pre-emption if it is asserting a pending request; column three outlines how the client will behave if it owns the current active task and another client requests a pre-emption.

The above rules provide a systematic approach to pre-emption that relates to how much a client has experienced latency. The "bottom line" is, if a client is in priority region one, it allows other clients to get bandwidth if they experienced more latency based on a higher priority count, while on the other extreme, if a client is in priority region three, it does not allow another client to pre-empt it under any circumstances. Priority region two is an overlap region where clients cooperate by letting a new task pre-empt the current task.

Pre-emption Control

Pre-emption is generated by a priority encoder and governed by a priority decoder within the memory core. Requests to pre-empt an active task are generated when a client with a pending task in priority region two or three, has a priority count higher than the current active task in priority region one or two. This pre-emption is due to latency caused by the current active task. The client with the current active task will only deny access to a client with a higher priority, if the active task is being executed in priority region 3, as outlined above. This indicates the active task experienced a large amount of latency and may be, for example, near a point of failure.

Another variable that is considered with pre-emption is how much minimum bandwidth is a client allowed before it is pre-empted. Setting up a page within memory is expensive in terms of Row Address Strobe (RAS) precharge, and RAS to Column Address Strobe (CAS) delay. Programmability is allowed for a minimum number of data accesses allowed by the client before it is pre-empted, in order to avoid being inefficient with page setups to burst length bandwidth. Ideally, the maximum bandwidth a single client can achieve is to continuously burst to/from the same RAS page.

Accumulating Priority

A client has priority incremented when it has a pending request to access the resource. As the client is denied access, its priority is incremented by the priority encoder. The priority decoder interprets where the client is within the priority curve, and feedbacks the priority count rate changes to the priority encoder, the rate at which the priority is incremented being based on what region the client is in.

When a client is given access to the resource, the priority is reset to the base priority if the client does not have a new request. If the client has a new pending request (the client continues to assert its request signal), the client holds its priority value until it is done with the first task, at which time, its priority count will be incremented where the count left off if it experiences latency with the second request. This strategy takes into account that clients typically have buffers that vary with capacity based on latency demands.

Client Versus Client Bandwidth Analysis

From the hardware support for priority and pre-emption outlined herein, a software environment can be written to determine the proper values to be programmed for each client's base priority, region's rate of change in priority based on latency, and the length of time a client's priority count will need to accumulate to reach each of the priority regions.

The software environment programs each of the clients based on the curves as outlined in FIG. 2. A challenging task with any hardware resource that is shared by many client's with varying tolerances to latency, is to analyze and design an arbitration scheme that will not induce errors, such as dropped frames or pixels, due to not meeting the bandwidth and latency demands of real-time-video clients. In addition, with all of the above considerations outlined, it would be complicated to calculate all the variables by hand.

With this software environment, the clients can be prioritized first, based on avoiding such errors. For example, a client requesting data for video screen refresh would be considered a high-priority client.

Based on screen resolution and pixel depth supported, which can change based on a user's application, a curve can be plotted for each resolution and pixel depth combination supported in order to guarantee that for a given amount of a latency experienced by the client, a rate of priority and region placement would prohibit a client from ever seeing errors.

This technique becomes even more effective when multiple real-time clients share the same resource with clients having a negative impact on performance if excessively latent (such as a CPU read cycle). Plots are generated based on prohibiting errors from occurring, and optimizing as much performance as possible for key clients affecting overall system performance.

As more client curves are built, "what if" scenarios are considered in determining cases where bandwidth would simply run out based on previous priority curves, resulting in warnings indicating failing scenarios. These warnings may require architectural adjustments, for example, with a frame rate of a real-time-YUV-frame-grabber client, based on the resolution and pixel depths supported for a video-refresh client. These warnings may also report projected performance of the CPU based on the curves calculated for the realtime clients.

Figure 5:
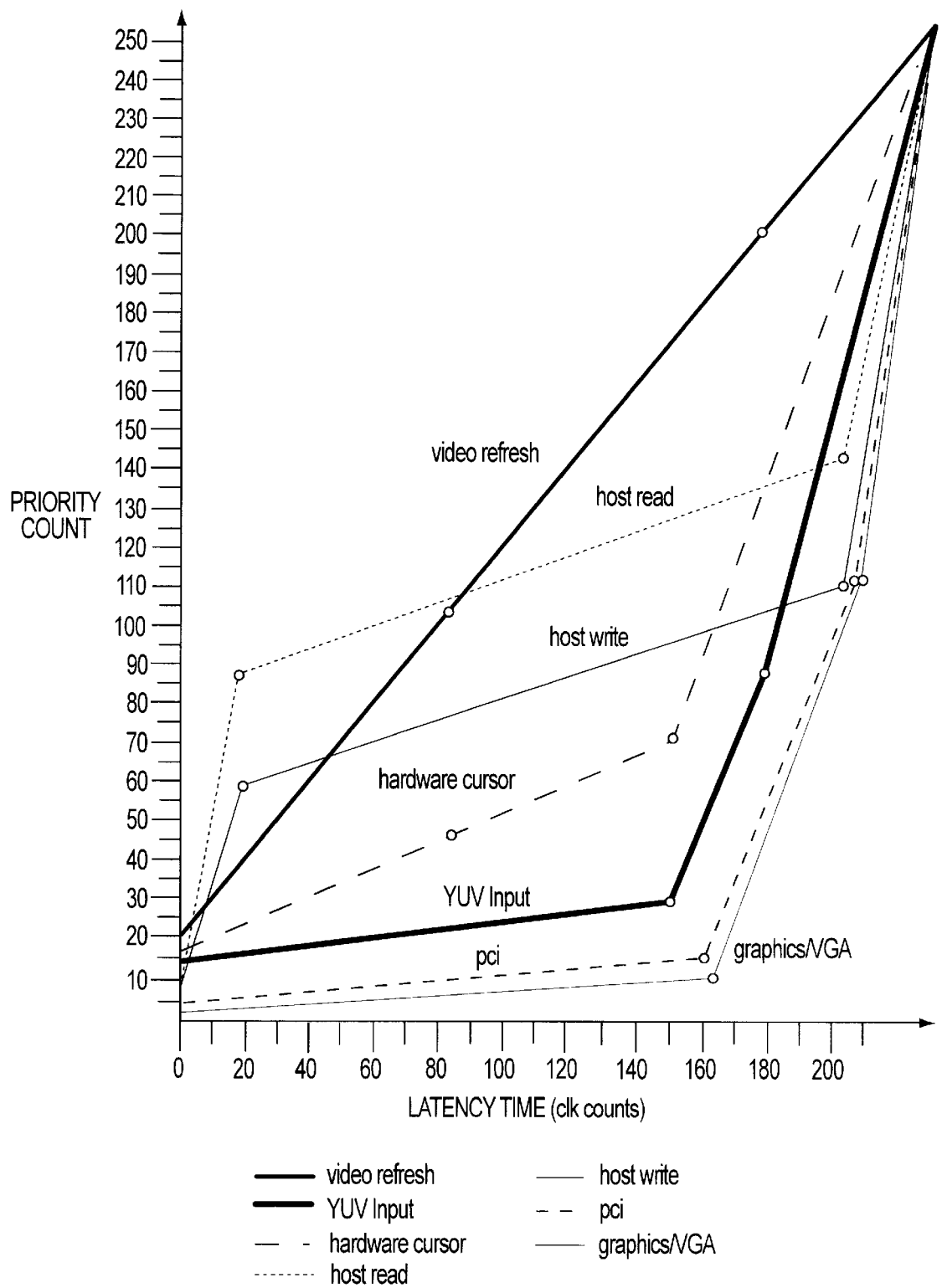
FIG. 5 illustrates the results of the program calculations, based on the input file of FIG. 4.

A sample program input file is illustrated in FIG. 4, and is described below. FIGS. 4 and 5 illustrate a program that determines the register values to be loaded by software drivers and the results thereof, respectively. These values are loaded for each client to determine the bandwidth and priority usage for each client. All rights in this program are hereby expressly reserved.

FIG. 4 outlines an exemplary input file to the program. The input file first outlines the targeted DRAM technology used, which affects the time between bursts based on row address setup and hold to row address strobe (RAS), column address setup and hold to column address strobe (CAS), RAS to CAS delay, and access time from both RAS and CAS.

SDRAMs have similar timing parameters to consider (as with EDO and BEDO DRAMS), centered around activation of a row instead of RAS generation, and read or write commands instead of CAS generation.

Other considerations are the clock input which defines the fastest burst speed (the burst clock). Accesses by each separate client entry (task) assumes a row page miss for worst-case real-time-client-latency requirements. Finally, the interval of the bandwidth and latency measurement defines the window of time where all clients will be measured for memory usage. In this example, the interval is the horizontal-scan frequency-this is the critical time for the video refresh client.

After the target memory and processor speeds (clock) are specified, each client has entries based on its bandwidth usage and latency that it can tolerate. Real-time clients are classified as point-of-failure clients, since if their latency tolerance is exceeded, a failure occurs such as dropped bits on the video screen. Other clients are classified as performance sensitive, such as the host read port (ports like this will directly impact performance based on stalling the CPU until the read access is completed). The third classification is no impact-lower priority clients are classified this way since there is less of a performance impact or failure to the system if they experience excessive latency.

The burst length is not necessarily but often fixed within a given client. The burst length, number of bursts per interval, and the point-of-failure/performance impact are directly related to the client's bandwidth requirements influenced by data versus clock, buffer (FIFO) sizes and data path width. Each client will vary in these areas.

In addition, a given client may vary based on a mode of operation. For example, the video-refresh client will vary in bandwidth-and-latency requirements based on screen resolution (horizontal×vertical×vertical scan frequency) and pixel depth (e.g. 8, 16 or 24 planes) which directly affects the number of bursts required per interval due to increasing or decreasing demands on frame-buffer accesses. If the video-refresh client also varies its FIFO sizes and management based on a video resolution or pixel depth, the number of bursts per interval will be affected even further. Therefore, what also aids in driver's register value determination is the ability to run this program with a data-input file for each resolution and pixel depth supported by the video-refresh client. Files describing all client permutations can be generated and run, with the software drivers using the results based on the selection of a mode of operation.

FIG. 5 illustrates the results of the program calculations, based on the input file of FIG. 4. The power of implementing such curves in hardware is realized when the host (CPU) read and write clients can be given higher priority over the real-time clients for a period of time where the latency does not reach a point of failure for the real-time clients. The real-time clients can also assert requests without regard for performance. This allows clients such as host (CPU) reads to gain access to avoid pipeline stalls.

The hardware supports rates of change of priority based on an integer divide of the bus clock between divide by 1 to 32. This allows varying slopes to control rate of priority change versus latency time. This allows performance oriented clients to accumulate priority (ideally) nearing an impulse function, with less aggressive slopes as real time clients approach point of failure.

Real-time (higher-priority) clients are calculated first. Clients consuming more bandwidth within the interval of BW measurement are plotted a curve with more of a constant slope. In addition, the length of time between requests affects the slope of the total curve, with longer periods between requests warranting less of a constant slope and less rate-of-priority increments. As a real-time client is denied, its priority increases approaching the point of failure.

Performance orientated clients are plotted next considering remaining bandwidth versus their latency-and bandwidth-requirements, and versus the previous plots of real-time-client requirements.

The right-most legend of the X-axis (latency time) may change in units of time up to three times within regions 1, 2 and 3 respectively. The only constant here is the count value (between 0–255 in this example) all curves are plotted and converge with this count value considered. Within the hardware, a client's priority count and what region the priority count resides is what is used to determine the next active task and/or whether a current active task is pre-empted. The curves are used as a performance tool.

The pre-emption rules outlined in FIG. 3 allow lower priority clients to approach near impulse priority count growth by defining region 2 with less aggressive slopes, and allowing to be pre-empted by real-time clients. On the other end, real-time clients deny pre-emption in region 3, which is calculated near the point of failure- region 3 for real-time clients is greater in terms of width of time than for performance oriented clients.

The lowest priority clients, classified as no impact, are plotted with very shallow slopes, and are plot always lower in priority than clients with higher base priorities, or classified as real-time or performance impacted. These lower-priority clients are plotted to allow requests to pre-empt within its region 2 and 3. However, any clients with higher priority will not be pre-empted. Clients of this nature may peak out their priority counts in time of peak BW demands, or when the capacity left over for these clients within the BW interval of measurement approaches zero, for example, with a large screen resolution and pixel depth, or intense graphic applications. Other graphics clients are programmed as no impact or performance impact based on such graphics applications.

An exemplary embodiment of the current invention is implemented within a chip called PUMA (Processor Unified Memory Architecture) which is a core-logic device interfacing a Pentium microprocessor to an L2 cache subsystem, a DRAM (SDRAM and EDO) memory architecture, as described above, a PCI subsystem, integrated VGA and Graphics Controller, YUV video input port, hardware cursor and video-frame-buffer refresh support.

Merging electronic commerce chip developments with the concept of an embedded PC as a Personal Data Assistant (PDA) companion to current smart card and Valuechecker™ readers will require a highly integrated chip, like the PUMA, with Electronic Commerce functionality, and an X86 or Risc processor, both chips being advantageously mounted on the same board with external memory. UMA is an advantage with high integration goals involving graphics and/or video display.

The invention has been described above by way of an exemplary embodiment, however, the scope of the invention is not intended to be limited thereby. As one of ordinary skill in the art would know, the above exemplary embodiment is subject to various modifications and enhancements within the spirit and scope of the invention, which is defined by the appended claims.

What is claimed is:

1. A shared resource access method for controlling access by a plurality of devices to a shared resource, the method comprising:
    establishing access priority based on a determination of device resource requirements, wherein the device resource requirements include at least one of base priority, latency, bandwidth, and throughput;
    granting access to the shared resource based on the establishing of access priority; and
    establishing a priority curve for each of the plurality of devices, wherein the priority curve represents a change in priority count with respect to a change in latency time;
    wherein the priority curve for each device comprises a first priority region, a second priority region, and a third priority region;
    wherein each of the first, second, and third priority regions has a respective rate of change of the priority count with respect to latency time; and
    wherein:
        in the first priority region, a device will permit preemption by another device but will not request preemption of another device;
        in the second priority region, a device will permit preemption by another device and will also request preemption of another device; and
        in the third priority region, a device will request preemption of another device but will not permit preemption by another device.

2. The method according to claim 1, further comprising:
    classifying devices in performance categories;
    wherein the performance categories include:
        a point-of-failure type device category for devices for which a failure occurs if a given latency tolerance for the device is exceeded;
        a performance sensitive type device category for devices for which performance is adversely affected to a first extent that is less than failure, if the given latency tolerance for the device is exceeded; and
        a no-impact lower priority type device category for devices for which performance is adversely affected to a second extent that is less than the first extent if the given latency tolerance for the device is exceeded.

3. The method according to claim 2, further comprising determining priority based on the performance categories, including
    calculating the priority curves first for the point-of-failure type devices,
    then calculating the priority curves for the performance sensitive type devices, considering an amount of bandwidth remaining, and
    then calculating the priority curves for the no-impact lower priority type devices, considering an amount of bandwidth still remaining.

4. A shared resource access system, which controls access by a plurality of devices to a shared resource, the system comprising:
    a priority encoder that receives resource access requests from the plurality of devices, and encodes priority values to the resource access requests, based on stored variables, to generate respective pending resource access requests;
    a priority decoder that decodes and compares the priority values of the pending resource access requests and determines a highest priority resource access request to be a winning request;
    an arbiter that arbitrates between an active resource access request and the winning request from the priority decoder and provides an access output;
    a resource controller that controls access to the shared resource based on the access output from the arbiter; and
    an address decoder that decodes at least one address in the shared resource for use by one of the plurality of devices that corresponds to the access output;
    wherein the stored variables include latency values corresponding to respective ones of the resource access requests;
    wherein the priority values include a value located on a priority curve representing a change in priority count with respect to a change in the latency value, wherein the priority curve is divided into a plurality of regions; and
    wherein each of the plurality of regions of the priority curve has a respective rate of change of the priority count with respect to the latency value.

5. The shared resource access system of claim 4, wherein a first rate of change of the priority count in a first region of the priority curve having a first latency value is greater than a second rate of change of the priority count in a second region of the priority curve having a second latency value, where the first latency value is greater than the second latency value.

6. A shared resource access method for controlling access by a plurality of devices to a shared resource, the method comprising:

establishing resource access priority for each of the respective plurality of devices, based on a determination of respective device resource requirements; and granting access to the shared resource based on the established resource access priority;

wherein the device resource requirements include latency values for the respective devices;

wherein establishing resource access priority includes establishing a priority curve for each of the respective devices, representing a change in a priority count of the respective device with respect to a change in the latency values; and wherein the priority curve is divided into a plurality of regions, wherein each of the plurality of regions has a respective rate of change of the priority count with respect to latency value.

7. The method of claim 6, wherein a first rate of change of the priority count in a first region of the priority curve having a first latency value is greater than a second rate of change of the priority count in a second region of the priority curve having a second latency value, where the first latency value is greater than the second latency value.

\* \* \* \* \*